(12) United States Patent
Wojtaszek

(10) Patent No.: US 11,197,130 B2
(45) Date of Patent: Dec. 7, 2021

(54) METHOD AND APPARATUS FOR PROVIDING A BOT SERVICE

(71) Applicant: MOTOROLA SOLUTIONS, INC, Chicago, IL (US)

(72) Inventor: Dominik Wojtaszek, Debica (PL)

(73) Assignee: MOTOROLA SOLUTIONS, INC., Chicago, IL (US)

(*) Notice: Subject to any disclaimer, the term of this patent is extended or adjusted under 35 U.S.C. 154(b) by 355 days.

(21) Appl. No.: 16/328,338

(22) PCT Filed: Nov. 16, 2016

(86) PCT No.: PCT/PL2016/050054
§ 371 (c)(1),
(2) Date: Feb. 26, 2019

(87) PCT Pub. No.: WO2018/093278
PCT Pub. Date: May 24, 2018

(65) Prior Publication Data
US 2021/0289325 A1    Sep. 16, 2021

(51) Int. Cl.
*H04W 4/10* (2009.01)
*G06F 16/335* (2019.01)

(52) U.S. Cl.
CPC .......... *H04W 4/10* (2013.01); *G06F 16/335* (2019.01)

(58) Field of Classification Search
CPC ......... H04W 4/08; H04W 4/10; H04W 76/45; H04L 65/4061; G06F 16/335
See application file for complete search history.

(56) References Cited

U.S. PATENT DOCUMENTS

| 6,005,848 A * | 12/1999 | Grube | H04W 8/186 370/266 |
| 9,361,605 B2 | 6/2016 | Yablokov et al. | |
| 2006/0014555 A1* | 1/2006 | Paszkat | H04W 4/08 455/518 |
| 2006/0072517 A1* | 4/2006 | Barrow | H04W 8/06 370/335 |
| 2006/0234676 A1* | 10/2006 | Harris | H04L 63/08 455/410 |
| 2007/0116224 A1* | 5/2007 | Burke | H04L 65/1083 379/201.12 |
| 2010/0159976 A1* | 6/2010 | Marocchi | H04W 8/186 455/519 |

(Continued)

OTHER PUBLICATIONS

Donghui Feng et al.: "An intelligent discussion-bot for answering student queries in threaded discussions", 2006 International Conference on Intelligent User Interfaces. IUI 06. Sydney, Australia, Jan. 29-Feb. 1, 2006; [Annual International Conference on Intelligent User Interfaces], New York, NY: ACM, US Jan. 29, 2006, pp. 171-177.

(Continued)

*Primary Examiner* — Raymond S Dean

(57) ABSTRACT

A method and apparatus for providing a bot service is described herein. During operation a bot server will receive a request from a user. An action will be taken by the bot server that is dependent upon a talkgroup associated with the user. Because the action taken by the bot server is dependent upon talkgroup, the action taken can be tailored to specific individuals.

11 Claims, 4 Drawing Sheets

```
POLICE TALKGROUP

OFFICER TOM: CHECK
KWI20986
                    PLATEBOT:

10-28. INSURED. NOT STOLEN. ....
10-27. OWNER.... NO PRIORS......
ALL GOOD. CARRY ON.
-------------
THIS LICENSE PLACE IS
FROM WIELICZKA, POLAND,
OWNER BOB SMITH OF 123
MAIN STREET
```

```
CITY WORKER TALKGROUP

BETTY: CHECK KWI20986
                    PLATEBOT:
--------
THIS LICENSE PLACE IS FROM
WIELICZKA, POLAND, OWNER
BOB SMITH
```

(56) References Cited

U.S. PATENT DOCUMENTS

| | | | |
|---|---|---|---|
| 2010/0246535 A1* | 9/2010 | Lindner | H04W 76/45 |
| | | | 370/332 |
| 2013/0172037 A1* | 7/2013 | Govind | H04W 8/186 |
| | | | 455/518 |
| 2017/0339535 A1* | 11/2017 | Mazzarella | H04L 65/1059 |
| 2018/0052926 A1* | 2/2018 | Boudville | G06F 16/951 |

OTHER PUBLICATIONS

Ibadibam: "Push-to-talk", Wikipedia, Sep. 23, 2016 (Sep. 23, 2016), XP002771693, Retrieved from the Internet: URL:https://en.wikipedia.org/w/index.php?title=Push-to-talk&oldid=740872729 [retrieved on Jul. 4, 2017], all pages.

Meyer R: "Push-To-Talk IM GSM-NETZ Fuer Die Professionelle Nutzung", NTZ (Nachrichtentechnische DE, Zeitschrift), 1VDE Verlag GMBH, DE, vol. 57, No. 6, Jan. 1, 2004 (Jan. 1, 2004), pp. 22-24, XP001197682, the ISSN: 0948-728X.

Dilidor: "Bots", Wikipedia, Nov. 8, 2016 (Nov. 8, 2016), XP002771694, Retrieved from the Internet: URL: https://en.wikipedia.org/w/index.php?title=Wikipedia:Bots&olddid=748481260 [retrieved on Jul. 4, 2017] all pages.

The International Search Report and the Written Opinion corresponding patent serial No. PCT/PL2016/050054 filed Nov. 16, 2016, all pages.

\* cited by examiner

POLICE TALKGROUP

OFFICER TOM: CHECK KWI20986

PLATEBOT:

10-28. INSURED. NOT STOLEN. ....
10-27. OWNER.... NO PRIORS......
ALL GOOD. CARRY ON.
- - - - - - - - - - - -
THIS LICENSE PLACE IS FROM WIELICZKA, POLAND, OWNER BOB SMITH OF 123 MAIN STREET

CITY WORKER TALKGROUP

BETTY: CHECK KWI20986

PLATEBOT:
- - - - - - - -
THIS LICENSE PLACE IS FROM WIELICZKA, POLAND, OWNER BOB SMITH

*FIG. 1*

METHOD AND APPARATUS FOR PROVIDING A BOT SERVICE

FIELD OF THE INVENTION

The present invention generally relates to providing a bot service, and more particularly to a method and apparatus for providing a bot service based on talkgroup.

BACKGROUND OF THE INVENTION

A bot is an application that performs an automated task. For example, a bot allows a person to text a number to order pizza and have it delivered without ever talking to a real human. Bots are replacing many applications that currently reside on smart devices. Instead of running an application on, for example, your smart phone, a person can now text a bot service and have the result provided to you from the bot service.

While bots are great at providing information to users, a problem exists when the information provided to the user needs to be specifically tailored to the user. For example, imagine a bot service that provides license plate information to a public-safety officer. In this situation, a license plate may be text to a bot service, and owner information may be returned to the public-safety officer. A problem exists in that the information provided by the bot service should be tailored to a role of the public servant. For example, information returned to a police officer may contain things like arrest records, past convictions, . . . , etc. This information may not be needed by, for example, a city inspector. In other words, the information returned from the bot service should be tailored to the role of the user of the bot service. Therefore, a need exists for a method and apparatus for providing a bot service to a user that alleviates the above-mentioned problem.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 1 illustrates information provided by a bot server.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for providing a bot service is described herein. During operation a bot server will receive a request from a user. An action will be taken by the bot server that is dependent upon a talkgroup associated with the user. Because the action taken by the bot server is dependent upon talkgroup, the action taken can be tailored to specific individuals.

As an example of the above, consider a bot service that provides personal information associated with a license plate. The bot server may receive a license plate number along with a talkgroup identification (ID). The bot server can then provide information tailored to the specific talkgroup ID. So, for example, members of a first talkgroup may receive first information from the bot server, while members of a second talkgroup may receive second information from the bot server. This is illustrated in FIG. 1.

FIG. 1 illustrates a screen on a smart device, where a bot is accessed by texting the bot service (PlateBot). Officer Tom, as part of a police talkgroup will text PlateBot with license plate KWI20986, and in return obtain first information about the owner of the license plate. However, when Betty (a city worker, belonging to a second talkgroup) texts PlateBot with the same license plate, PlateBot will return second information, which may be filtered first information (containing less information).

Figure 2:
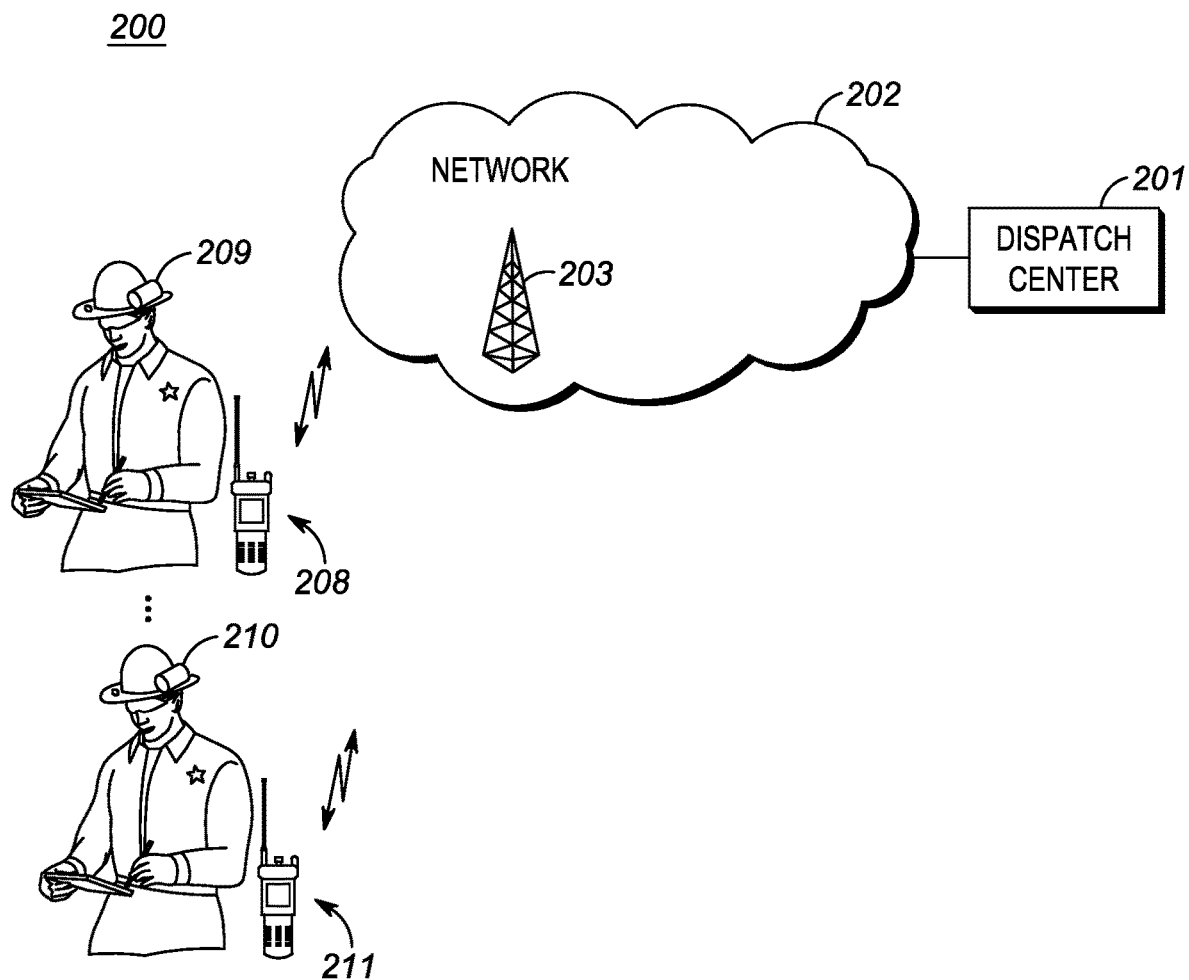
FIG. 2 shows a a general operating environment.

FIG. 2 is a block diagram showing a general operational environment of communication system 200, according to one embodiment of the present invention. As shown in FIG. 2 a plurality of officers 209-210 and radios 208 and 211 are in communication with dispatch center 201 (serving as a bot server 201) through base station 203 and intervening network 202.

Devices 208 can be any portable electronic device including but not limited to a standalone display or monitor, a handheld computer, a tablet computer, a mobile phone, a police radio, a media player, a personal digital assistant (PDA), a GPS receiver, or the like, including a combination of two or more of these items. As one of ordinary skill in the art will recognize, modern two-way radio systems feature talkgroup creation where it is possible for a radio to be a member of any combination of talkgroups. As a member of a talkgroup, a radio may receive transmissions from, as well as transmit to all members of the talkgroup. Transmission and reception of information to radios outside of an assigned talkgroup is generally not performed. Illustratively, a radio assigned to an ambulance may be a member of a Fire & Rescue talkgroup as well as a Law Enforcement talkgroup. Therefore, the radio may communicate with all members of the Fire & Rescue talkgroup as well as the Law Enforcement talkgroup.

Network 202 may comprise one of any number of over-the-air or wired networks. For example network 202 may comprise a private 802.11 network set up by a building operator, a next-generation cellular communications network operated by a cellular service provider, or any public-safety network such as an APCO 25 network. Network 202 usually comprises several base stations 203 (only one shown). Base stations 203 can receive information (either control or media, e.g., data, voice (audio), video, etc.) in a signal devices 208, 211. Base stations 203 can also transmit information in signals to one or more devices 208, 211.

As discussed above, while bots are great at providing information to users, a problem exists when the information provided to the user needs to be specifically tailored to the user. In order to address this need, dispatch center 201 will provide a bot service that tailors information provided to a radio based on the radio's talkgroup(s) it is affiliated with. For example, both radio 208 and radio 211 may access a bot provided by dispatch center 201. The bot may be accessed via standard text messaging, or alternatively via a push-to-talk voice communication with the bot. When the bot is accessed by any radio 208, 211, the radio will provide a list of talkgroups that the radio is affiliated with. In response, dispatch center 201 will specifically tailor information provided to radios 208, 211 based on each radio's talkgroup.

Figure 3:
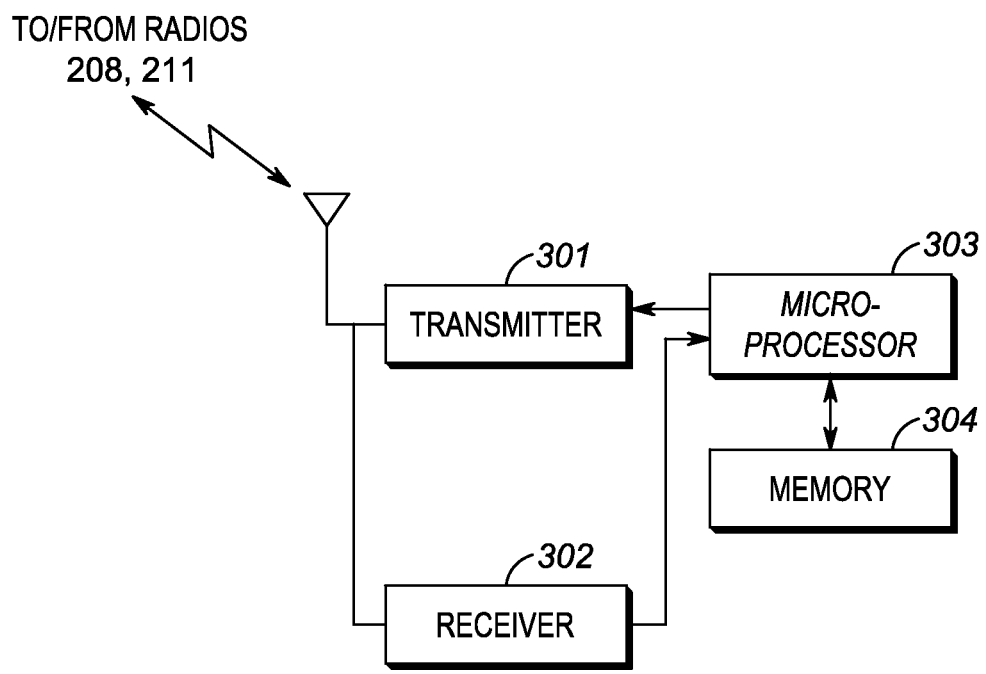
FIG. 3 is a block diagram of a bot server of FIG. 2.

FIG. 3 shows an exemplary block diagram of dispatch center 201 of FIG. 2. As shown, dispatch center 201 may include transmitter 301, receiver 302, and logic circuitry 303. In other implementations, device 106 may include more, fewer, or different components.

Transmitter 301 and receiver 302 may be well known long-range and/or short-range transceivers that utilize a private 802.11 network set up by a building operator, a next-generation cellular communications network operated by a cellular service provider, or any public-safety network such as an APCO 25 network or the FirstNet broadband network. Transmitter 301 and receiver 302 may also contain multiple transmitters and receivers, to support multiple communications protocols simultaneously.

Logic circuitry 303 comprises a digital signal processor (DSP), general purpose microprocessor, a programmable logic device, or application specific integrated circuit (ASIC) and is utilized to provide a bot service to radios based on the radios talkgroup.

Memory 304 comprises standard random access memory and is used to store information, such as license plate information. Additionally, memory 304 may store instructions, that when executed by logic circuitry 303, cause logic circuitry 303 to perform a bot service.

The dispatch center shown in FIG. 3 provides for an apparatus comprising a receiver receiving a workgroup identification (ID) and receiving a request to provide a bot service, logic circuitry performing the bot service, and providing information to a user, wherein the information provided to the user is tailored to the user based on the bot service and additionally based on the workgroup ID.

In one embodiment of the present invention, the workgroup comprises a public-safety talkgroup. Additionally, the bot service may comprise a database search, however, in alternate embodiments the bot service may comprise other tasks that are dependent upon the workgroup ID received. In addition, the workgroup ID can be received via a push-to-talk communication on a public-safety network. The workgroup ID and the request may be received via via a text video, or picture communication. A transmitter is provided for transmitting information to the radio as part of the bot service, the information based on the workgroup ID.

As discussed, the information provided to the user is tailored based on the bot service and additionally based on the workgroup ID such that first information may be provided to a user with a first workgroup ID, and second information may be provided to a second user with a second workgroup ID. The second information may be a subset of the first information.

Figure 4:
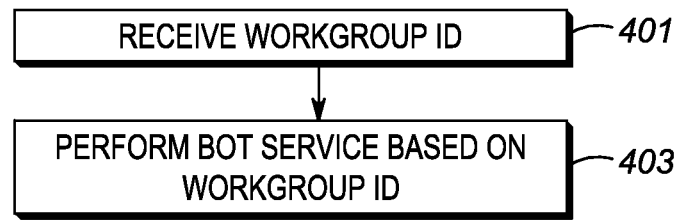
FIG. 4 shows operation of the server of FIG. 3.

FIG. 4 is a flow chart showing operation of the bot server 201. The logic flow begins at step 401 where receiver 302 receives a talkgroup identification (ID) from a radio along with a request to provide a bot service. In response, microprocessor 303 performs the bot service based on the talkgroup ID (step 403). As part of performing the bot service, information may be transmitted (via transmitter 301) to the radio, the information based on the talkgroup ID.

The bot service is designed to provide a best response to the user based on the user's talkgroup (or workgroup). As discussed above, the bot service may comprise a database search, with the results of the database search being provided to the radio. The results of the database search may be filtered, with first information provided to users associated with a first talkgroup ID, and second information provided to users associated with a second talkgroup ID.

The step of receiving the talkgroup ID comprises the step of receiving the talkgroup ID via a push-to-talk communication on a public-safety network. As one of ordinary skill in the art will recognize, utilizing a push-to-talk feature on a public-safety network will result in talkgroup information being provided (via standard signaling) as part of the communication. This talkgroup information is utilized by microprocessor 303 when providing a bot service to a radio. The step of receiving the talkgroup ID and the request may also be received via a text communication. Alternatively, the talkgroup ID may be received via other forms of communications. For example, the talkgroup ID may be transmitted by a radio along with a video or image (picture). The talkgroup ID may be embedded within metadata associated with any multimedia content.

Figure 5:
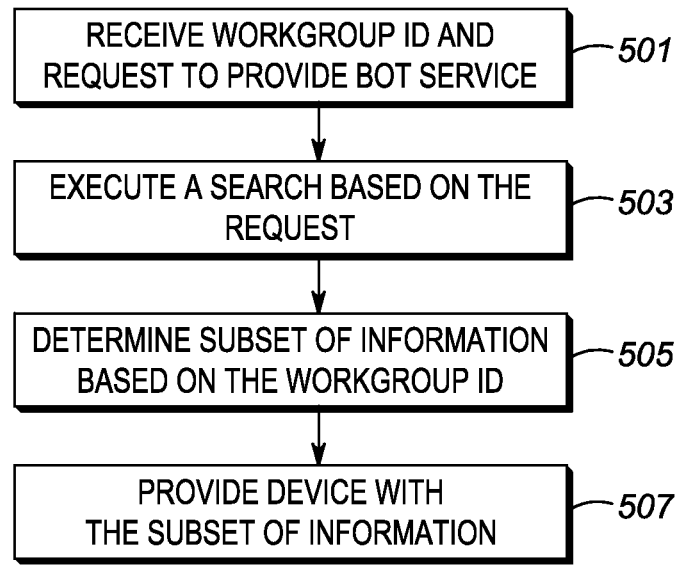
FIG. 5 is a flow chart showing operation of the device of FIG. 3.

FIG. 5 is a flow chart showing operation of the bot server 201. The logic flow begins at step 501 where a workgroup identification (ID) and a request to provide a bot service is received by receiver 302 from a device. In this particular embodiment, a "workgroup" is an identification that provides infrastructure with a particular group a user is associated with. For example, a user may be associated with a public works workgroup, a animal control workgroup, . . . , etc. Of course, the workgroup may comprise a public-safety talkgroup as known in the art.

In response to receiving the request, processor 303 executes a search for information based on the request by accessing memory 304 (step 503). A subset of information contained in memory 304 is determined by microprocessor based on the workgroup ID (step 505). At step 507 transmitter 301 provides the device with the subset of information. The subset of information comprises first information when a first talkgroup identification is received, and comprises second information when a second talkgroup identification is received. For example, if the first talkgroup ID comprises a public-safety officer talkgroup ID, the first information may comprise arrest information, wanted information, and/or past criminal activity, and address information. In a similar manner, if the second talkgroup ID comprises a city inspector talkgroup ID, the second information may simply comprise address information.

As discussed above, the step of receiving the talkgroup ID may comprise the step of receiving the talkgroup ID via a push-to-talk communication on a public-safety network, the step of receiving the command to execute the bot service may comprise the step of receiving the command via the push-to-talk communication on the public-safety network, and the step of receiving the talkgroup ID and the command may comprise the steps of receiving the talkgroup ID and the command via a text, video, or picture communication.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for providing results of a license plate search to a radio within a public-safety network, the method comprising the steps of:
   receiving a talkgroup identification (ID) via a push-to-talk communication on the public-safety network;
   receiving a request to provide the license plate search;
   performing the license plate search;
   transmitting license-plate search results to the radio, wherein the license-plate search results comprises first information about an owner of a vehicle when a first talkgroup identification is received, and comprises second information about the owner of the vehicle when a second talkgroup identification is received.

2. The method of claim 1 wherein the step of receiving the talkgroup ID and the request comprises the steps of receiving the talkgroup ID and the request via a text, video, or picture communication.

3. A method for providing a license plate search, the method comprising the steps of:
   receiving a talkgroup identification (ID) from a device;
   receiving, from the device, a request to perform a license plate search;
   executing the license-plate search based on the request;
   providing the device with a subset of the license-plate search results based on the talkgroup ID, wherein the subset of the license-plate search results comprises first information about an owner of a vehicle when a first talkgroup identification is received, and comprises second information about the owner of the vehicle when a second talkgroup identification is received.

4. The method of claim 3 wherein the step of receiving the talkgroup ID comprises the step of receiving the talkgroup ID via a push-to-talk communication on a public-safety network.

5. The method of claim 4 wherein the step of receiving the request to perform the license plate search comprises the step of receiving the request via the push-to-talk communication on the public-safety network.

6. The method of claim 3 wherein the step of receiving the talkgroup ID and the request comprises the steps of receiving the talkgroup ID and the request via a text, video, or picture communication.

7. An apparatus comprising:
a receiver receiving a talkgroup identification (ID) and receiving a request to perform a license plate search;
logic circuitry performing the license plate search;
providing information to a user, wherein the license-plate search results provided to the user is tailored to the user based on the talkgroup ID;
a transmitter transmitting the license-plate search results to a radio wherein the license-plate search results are tailored such that such that first information about an owner of a vehicle is provided to a user with a first talkgroup ID, and second information about the owner of the vehicle is provided to a second user with a second talkgroup ID.

8. The apparatus of claim 7 wherein the talkgroup comprises a public-safety talkgroup.

9. The apparatus of claim 7 wherein the talkgroup ID is received via a push-to-talk communication on a public-safety network.

10. The apparatus of claim 7 wherein the request to perform the license plate search is received via a push-to-talk communication on the public-safety network.

11. The apparatus of claim 7 wherein the second information about the owner of the vehicle is a subset of the first information about the owner of the vehicle.

* * * * *